(12) United States Patent
Delplanque et al.

(10) Patent No.: US 10,060,360 B2
(45) Date of Patent: Aug. 28, 2018

(54) EXHAUST LINE VALVE AND CORRESPONDING ASSEMBLING PROCESS

(71) Applicant: Faurecia Systemes D'Echappement, Nantere (FR)

(72) Inventors: Gilbert Delplanque, Sochaux (FR); Julien Cambillard, Belfort (FR); Alain Mercier, Nommay (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 11 days.

(21) Appl. No.: 15/471,211

(22) Filed: Mar. 28, 2017

(65) Prior Publication Data
US 2017/0284310 A1   Oct. 5, 2017

(30) Foreign Application Priority Data
Mar. 30, 2016   (FR) ..................... 16 52748

(51) Int. Cl.
| | |
|---|---|
| *F01N 1/00* | (2006.01) |
| *F02D 9/10* | (2006.01) |
| *F02D 9/04* | (2006.01) |
| *F16K 1/22* | (2006.01) |
| *F16K 31/04* | (2006.01) |
| *F02M 26/54* | (2016.01) |
| *F02M 26/67* | (2016.01) |

(52) U.S. Cl.
CPC ............ *F02D 9/1065* (2013.01); *F02D 9/04* (2013.01); *F02D 9/107* (2013.01); *F02M 26/54* (2016.02); *F02M 26/67* (2016.02); *F16K 1/221* (2013.01); *F16K 31/043* (2013.01)

(58) Field of Classification Search
USPC .......................... 60/274, 291, 292, 293, 324
See application file for complete search history.

(56) References Cited

U.S. PATENT DOCUMENTS

| | | | | |
|---|---|---|---|---|
| 6,079,390 | A * | 6/2000 | Hashimoto | F02D 9/02 123/396 |
| 7,401,592 | B2 * | 7/2008 | Willats | F01N 13/08 123/190.14 |
| 7,537,196 | B2 * | 5/2009 | Nohl | F16K 1/221 251/129.04 |
| 7,748,404 | B2 * | 7/2010 | Abram | F02D 9/04 137/527 |
| 7,802,424 | B2 * | 9/2010 | Kanzawa | F01N 13/04 251/173 |

* cited by examiner

*Primary Examiner* — Binh Q Tran
(74) *Attorney, Agent, or Firm* — Carlson, Gaskey & Olds, P.C.

(57) ABSTRACT

A valve comprises a coupling device having a driven member bound to the drive shaft of a flap, a driving member bound to an output shaft of an actuator, and an elastic member. The driving member comprises attachments that hooks up the elastic member to the driving member in a temporary position in which the elastic member is elastically loaded. The driven member comprises at least one release member that at least partly releases the elastic member of the attachments when the coupling device is brought to an intermediate state or the elastic member, when the coupling device is in the intermediate state, may be at least partly released from the attachments. The elastic member once released, adopts a definitive use position under the effect of relaxation of the elastic load, the coupling device then adopting the operational state.

10 Claims, 6 Drawing Sheets

EXHAUST LINE VALVE AND CORRESPONDING ASSEMBLING PROCESS

CROSS-REFERENCE TO RELATED APPLICATIONS

This application claims priority to FR 1652748, filed Mar. 30, 2016.

TECHNICAL FIELD

The invention generally relates to exhaust line valves.

More specifically, the invention relates according to a first aspect to a valve of the type comprising a valve body; a flap positioned inside the valve body and movable relative to the body of the valve; a drive shaft to drive the flap; an actuator; an output shaft driven into rotation by the actuator; a coupling device comprising a driven member bound to the drive shaft, a driving member bound to the output shaft, and an elastic member; and the coupling device having an operational condition in which the driving member is laid out to drive the driven member into rotation relative to the valve body around an axis of rotation at least in a first direction of rotation, the elastic member being in a use position in which the elastic member is axially compressed between the driving member and the driven member and urges the driven member into rotation relative to the valve body around the axis of rotation in a second direction of rotation opposed to the first direction of rotation.

BACKGROUND

One example of this type of valve is known from DE 10 2011 107 088. During assembly of the valve, the elastic member is first placed on the driven member. In this temporary position, the elastic member is not elastically loaded. The elastic member is loaded at the moment of the assembly, by approaching the driving member to the driven member.

The elastic member has significant stiffness, so that the fact of having to load the latter makes assembly more difficult. Moreover, there exists a risk of poor positioning of the elastic member, or poor loading of the elastic member, in particular in an after-sales situation.

Moreover, EP 1 024 270 describes a valve for which the coupling device comprises a lever, a spiral spring, and a toothed wheel. This sub-set is pre-assembled and then assembled in one piece on the shaft for driving the flap.

In this context, the invention aims at proposing a valve not having the drawbacks above.

SUMMARY

In one exemplary embodiment, an exhaust line valve includes a driving member that comprises attachments configured to hook up the elastic member to the driving member in a temporary position in which the elastic member is loaded elastically, the temporary position being different from a position of use.

The coupling device may be brought to an intermediate state with the elastic member in the temporary position.

The driven member comprises at least one release member configured to release at least partly the elastic member from the attachments when the coupling device is brought to the intermediate state where the elastic member, when the coupling device is in the intermediate state, may be released at least partly from the attachments.

The elastic member once released, adopts the use position under the effect of relaxation of the elastic load, the coupling device then adopting the operational state.

Thus, the elastic member of the valve of the invention is preloaded, before assembling the coupling device. The elastic member is pre-positioned on the driving member. The risk of poor loading of the elastic member or of poor positioning of the elastic member is therefore considerably reduced. The assembly is facilitated, because the elastic member causes the coupling device to pass into the operational state when the elastic member is released.

The driven member is configured to guide the elastic member once it is released as far as its use position. The latter is placed automatically in this use position while partly slackening. It retains a portion of its elastic load, which is required for proper operation of the coupling device.

The valve may further have one or several of the features below, considered individually or according to all the technically possible combinations:

the driven member is configured to guide the elastic member, once the latter is at least partly released from the attachments, as far as its use position;

the elastic member in a temporary position is elastically loaded in compression parallel with the output shaft and circumferentially around the output shaft;

the elastic member is a helical spring having first and second ends opposite to each other, the attachments comprise a permanent attachment of the first end to the driving member and a removable attachment of the second end to the released driving member for having the elastic member pass to its position of use;

the driving member includes an upper bottom, the removable attachment comprising a hook secured to the upper bottom, the hook having a supporting area turned towards the upper bottom and delimited circumferentially on one side by a lateral abutment, the second end of the elastic member in a temporary position being urged elastically against the supporting area parallel to the output shaft and against the abutment circumferentially around the output shaft;

the driven member comprises a lower bottom, the release member protruding from the lower bottom parallel to the drive shaft and being with a selected shape so that, when the coupling device is brought to the intermediate state, the release member lifts up the second end above the supporting area by a sufficient height in order to cross the lateral abutment;

the release member is a first upright edge from the lower bottom, the driven member having a second upright edge from the lower bottom shifted along the second direction of rotation relative to the first upright edge, the second upright edge being separated from the first upright edge by a first notch in which will be housed the second end in the position of use; and the driven member comprises a lower bottom having a concave central area towards the valve body, the valve body bearing guiding bearings of the drive shaft at least partly accommodated in the concave central area.

According to a second aspect, the invention deals with a method for assembling an exhaust line valve of a vehicle, the valve comprising:

a valve body;
a flap positioned inside the valve body and movable relatively to the valve body;
a drive shaft to drive the flap;
an actuator;
an output shaft driven into rotation by the actuator;

a coupling device comprising a driven member bound to the drive shaft, a driving member bound to the output shaft, and an elastic member;

the method comprising the following steps:

hooking up the elastic member to the driving member with attachments in a temporary position in which the elastic member is elastically loaded;

bringing the coupling device to an intermediate state;

at least partly releasing the elastic member from the attachments, the elastic member passing from the temporary position to a use position under the effect of a relaxation of the elastic load, which causes the coupling device to pass into an operational state in which the driving member is laid out for driving the driven member into rotation relative to the valve body around an axis of rotation at least in a first direction of rotation, the elastic member in the use position being compressed axially between the driving member and the driven member and urging the driven member into rotation relative to the valve body around the axis of rotation in a second direction of rotation opposite to the first direction of rotation.

The method is specially adapted for the assembling of the valve having the features above.

Conversely, the valve is particularly suitable for being assembled by using the method above.

The method may further have the following feature: the elastic member is automatically at least partly released from the attachments when the coupling device is brought to its intermediate state.

According to a third aspect, the invention relates to an exhaust line including a valve having the characteristics above.

BRIEF DESCRIPTION OF THE DRAWINGS

Other features and advantages of the invention will become apparent from the detailed description which is given thereof below, as an indication and by no means as a limitation, with reference to the appended Figs., wherein.

DETAILED DESCRIPTION

Figure 1:
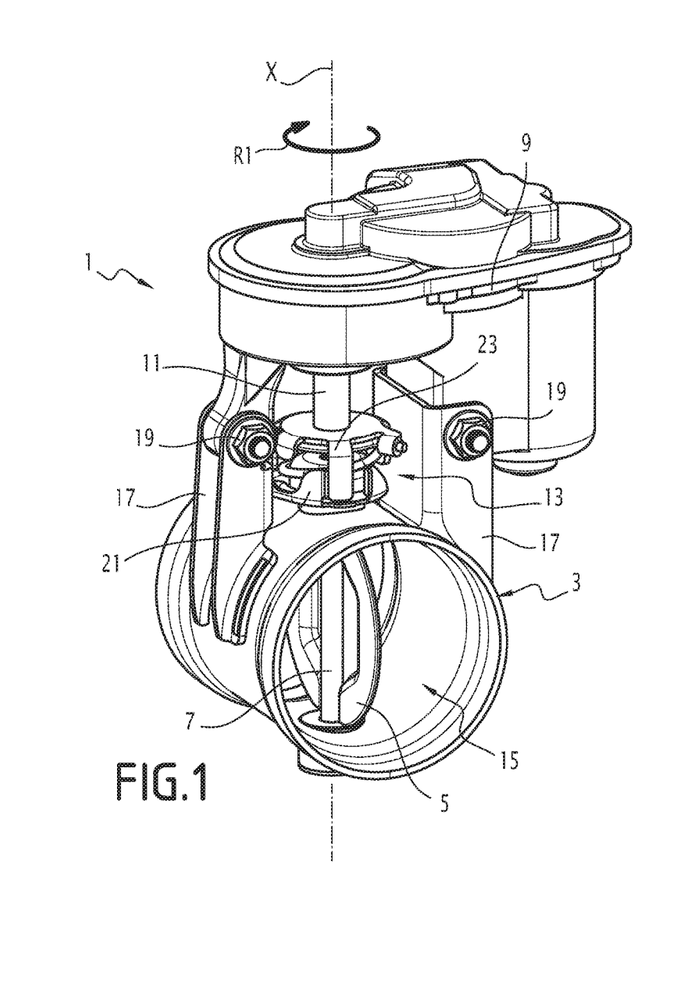
FIG. 1 is a perspective view of a valve according to a first embodiment of the invention.

A valve 1 illustrated in FIG. 1 is intended to be implanted in an exhaust line of a vehicle. The vehicle is typically an automobile vehicle, for example a car or a truck.

The valve 1 is, for example, intended to improve the acoustics of the vehicle, and is provided for opening or closing, either partly or totally, certain conduits of the exhaust line according to the operating point of an engine. In this case, it is typically implanted either at a tube located upstream from a rear silencer of the exhaust line or at a tube located downstream from the rear silencer of the exhaust line.

Alternatively, the valve 1 is provided for improving the emissions of pollutants from the exhaust line, in particular nitrogen oxide emissions, by allowing regulation of the recirculation level of the exhaust gases towards the admission of the engine. The valve 1 for this purpose allows adjustment of the counter pressure of the exhaust line. In this case, the valve 1 is typically inserted into a conduit giving the possibility of recycling the exhaust gases towards the admission of the engine, or immediately downstream from the connection between a main exhaust conduit and the conduit recycling the exhaust gases towards the admission of the engine.

Such a valve 1 is for example a three-way valve, provided with an inlet orifice and two outlet orifices, specifically located at a junction between the main exhaust conduit and the conduit recycling the exhaust gases towards the admission of the engine. The function of this three-way valve is then to ensure the distribution of the exhaust gases among both circuits.

The valve 1 may further be provided for directing the exhaust gases selectively into a member for recovering heat energy, or into a bypass allowing circumvention of this member.

Figure 2:
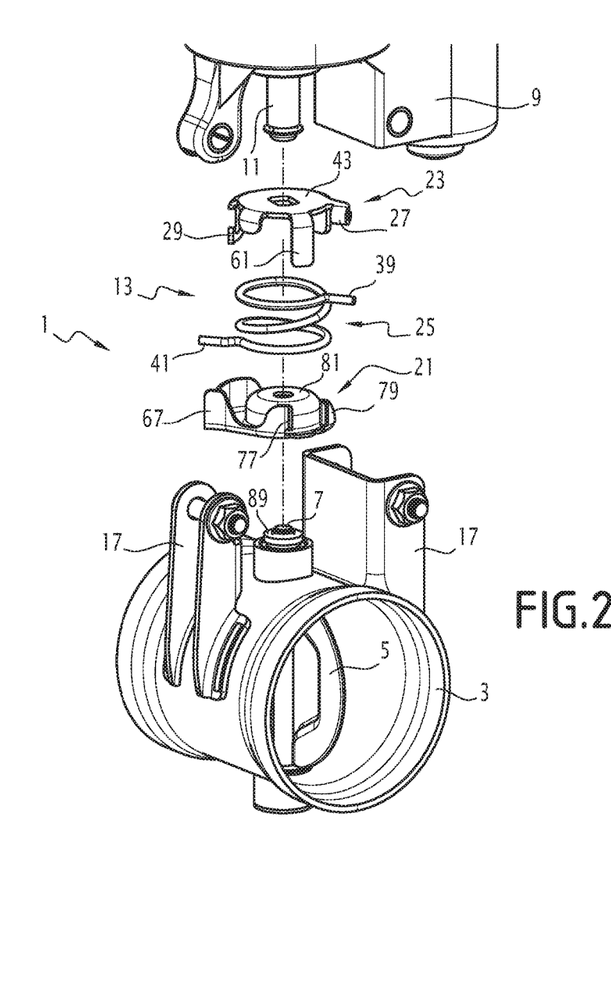
FIG. 2 is a partial view of the valve of FIG. 1, the coupling device being illustrated in an exploded view in order to show the different elements of the device.

As visible in FIGS. 1 and 2, the valve 1 includes a valve body 3, a flap 5 positioned inside the valve body 3 and movable relative to the valve body 3, and a shaft 7 that drives the flap.

The valve 1 further includes an actuator 9, an output shaft 11 driven into rotation by the actuator 9, and a coupling device 13.

The valve body 3 delimits interiorly a passage 15 for the exhaust gases, in which is positioned the flap 5.

The flap 5 is movable between a plurality of positions relative to the valve body 3. Typically, the flap 5 may be moved between a position for clearing the internal passage 15, a total or partial obturation position of the internal passage 15, and optionally one or several intermediate positions between the clearing position and the obturation position.

The flap 5 has any suitable shape. In the illustrated example, the flap 5 has a shape corresponding to the internal section of the valve body 3. In the illustrated example, the flap 5 is elliptical.

The valve 1 is, for example, of the butterfly type as illustrated in FIGS. 1 and 2. The drive shaft 7 extends in this case along a median line of the flap 5, which here is a small axis of the flap 5.

Alternatively, the valve 1 is of any other type.

In the illustrated example, the flap 5 is directly bound to the drive shaft 7, by any suitable connection.

The actuator 9 is provided to selectively move the flap 5 between these different positions. The actuator 9 is typically an electric motor, with or without a reducing gear.

In the illustrated example, the output shaft 11 is directly driven into rotation by the actuator 9.

In the example illustrated in FIG. 1, the actuator 9 is mounted on tabs 17 welded on the valve body 3 via a removable attachment member such as screws 19 for example.

The coupling device 13 transmits the engine torque of the actuator 9 from the output shaft 11 to the drive shaft 7, and to the flap 5.

To do this, and as illustrated in FIG. 2, the coupling device 13 comprises a driven member 21 bound to the drive shaft 7, a driving member 23 bound to the output shaft 11, and an elastic member 25.

The actuator 9 is attached removably to the valve body 3.

The coupling device 13 is itself also able to be disassembled. More specifically, the coupling device 13 has an operational state (FIGS. 1 and 3) wherein the driving member 23 is laid out for driving the driven member 21 into rotation relative to the valve body 3 around an axis of rotation X at least in a first direction of rotation R1, illustrated in FIG. 1.

Figure 3:
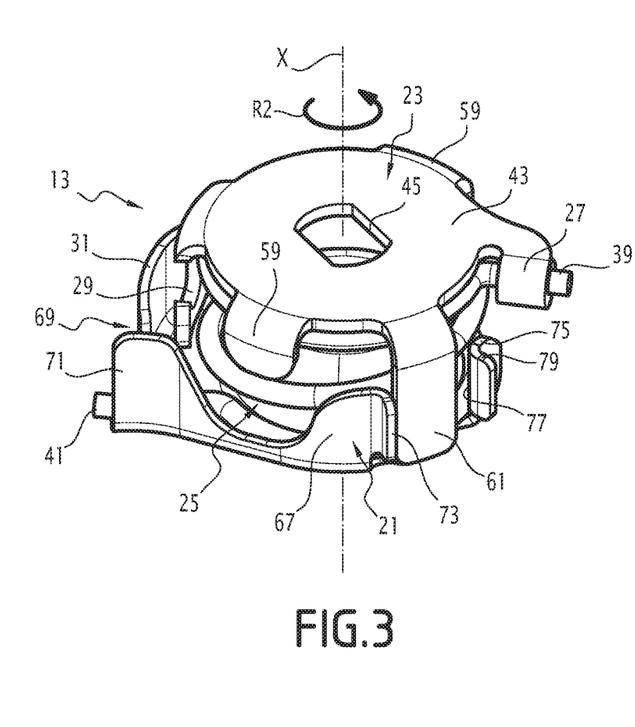
FIG. 3 is a perspective view of the coupling device of FIGS. 1 and 2 in an operational state.
Figure 4:
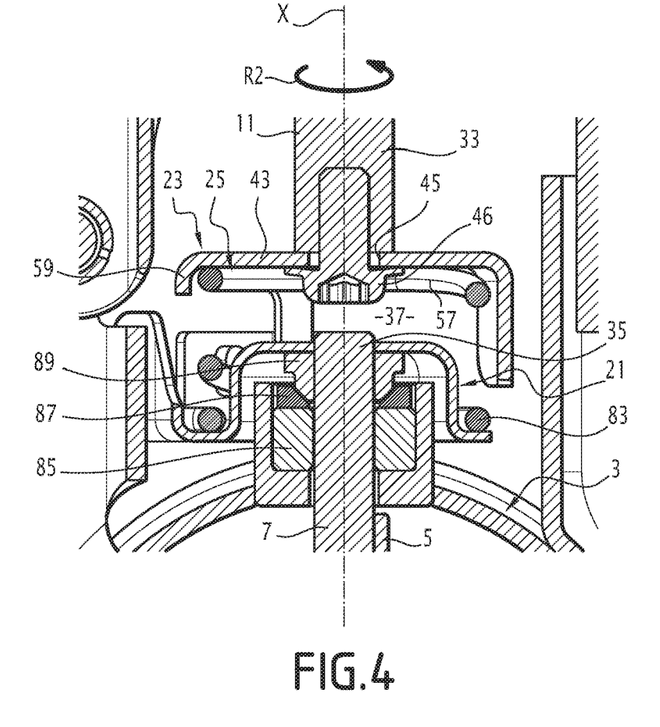
FIG. 4 is a partial sectional view of a portion of the valve of FIG. 1, showing the coupling device in the operational state.

When the coupling device 13 is in its operational state, the elastic member 25 is in a position of use illustrated in FIGS. 3 and 4.

In this use position, the elastic member 25 is axially compressed between the driving member 23 and the driven member 21. Moreover, the elastic member 25 urges the driven member 21 into rotation relative to the valve body 3 around the axis of rotation X, in a second direction of rotation R2, which is opposite to the first direction of rotation R1 (see FIGS. 3 and 4).

Moreover, the driving member 23 includes attachments 27, 29 configured to hook up the elastic member 25 to the driving member 23 in a temporary position. As visible in FIG. 5, the elastic member 25 in the temporary position is elastically loaded. The temporary position is different from the use position.

The elastic member 25 in the temporary position is typically elastically loaded in compression parallel with the output shaft 11 and circumferentially around the output shaft 11.

The coupling device 13 may be brought to an intermediate state with the elastic member 25 in its temporary position.

According to a first embodiment, illustrated in FIGS. 1 to 9, the driven member 21 comprises at least one release member 31 configured to release, at least partly, the elastic member 25 of the attachments 27, 29 when the coupling device 13 is brought towards its intermediate state.

Figure 10:
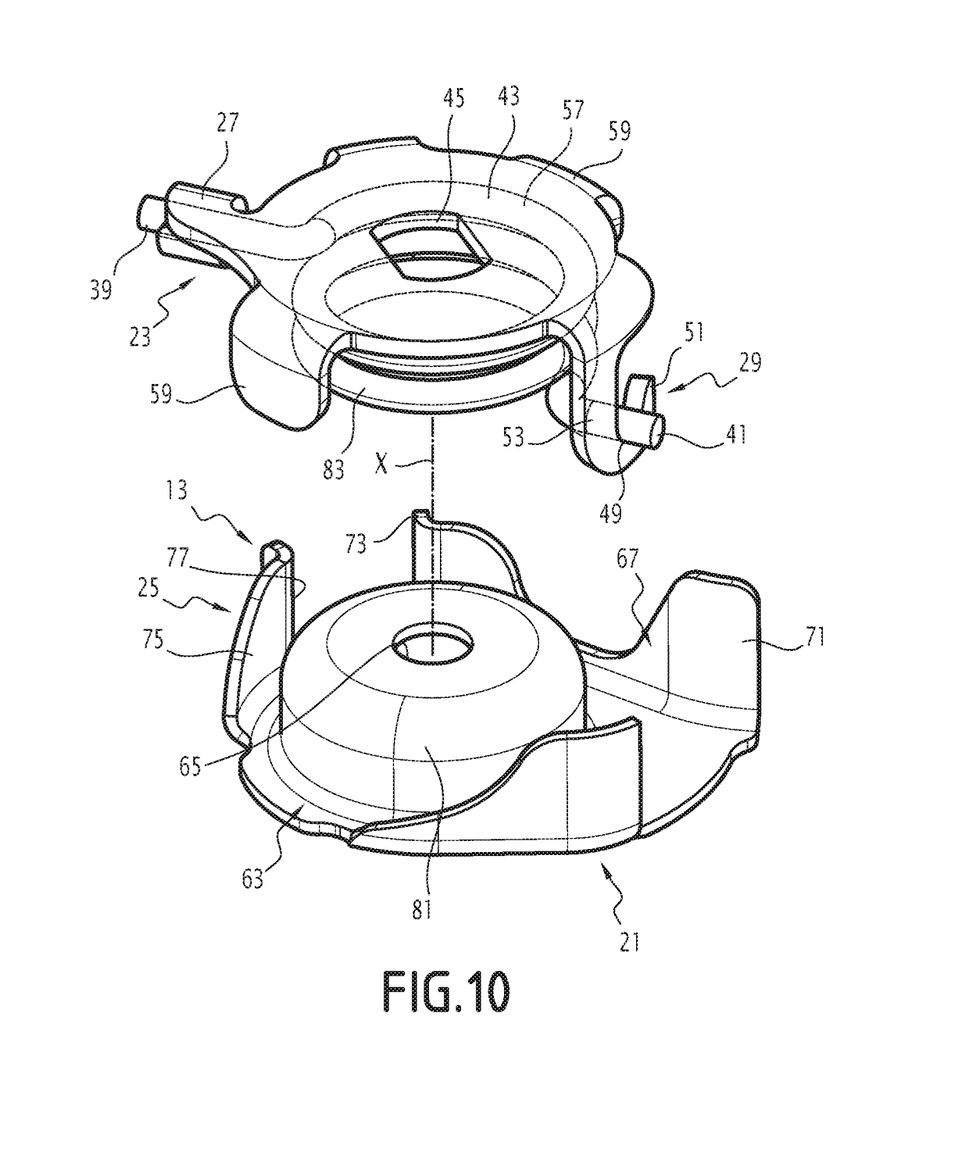
FIG. 10 is a perspective view similar to that of FIG. 5, for a second embodiment of the invention.

According to a second embodiment, illustrated in FIG. 10, the elastic member 25, when the coupling device 13 is in the intermediate state, is able to be released at least partly from the attachments 27, 29.

In both embodiments, the elastic member 25, once it is released at least partly from the attachments 27, 29, adopts its use position under the effect of relaxation of the elastic load, the coupling device 13 then adopting its operational state.

Figure 5:
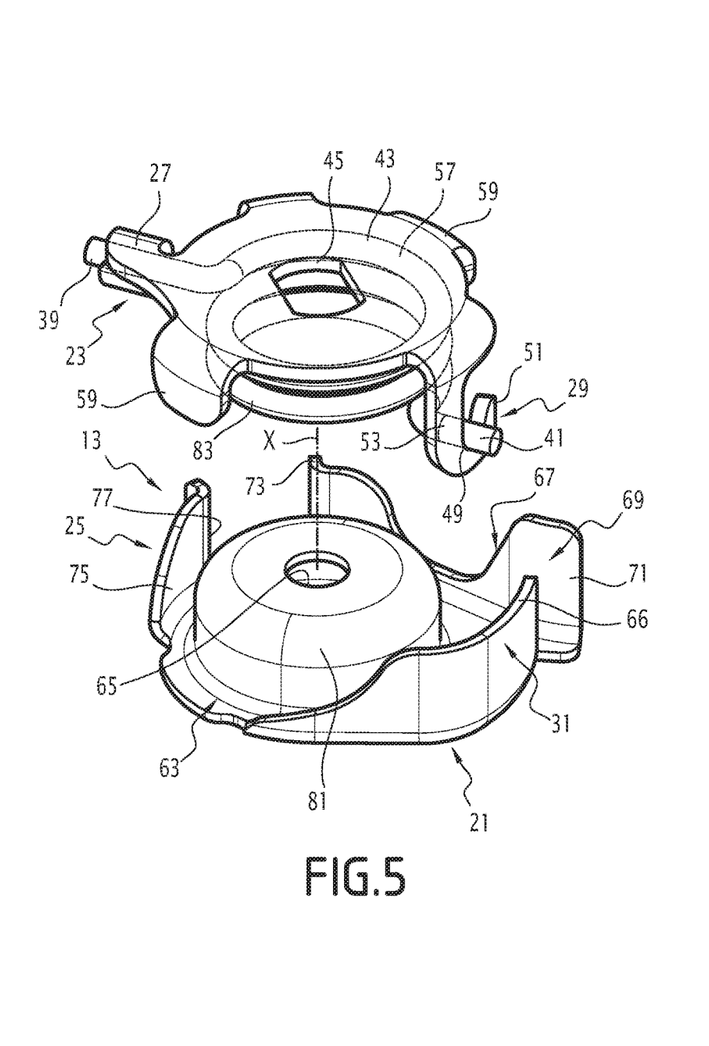
FIG. 5 is a perspective view of the coupling device of FIG. 3 with the elastic member in a temporary position.

FIG. 5 represents the coupling device in a state close to the intermediate state. In order to reach the intermediate state from the state of FIG. 5, the driving 23 and driven 21 members are brought closer to each other substantially along the axis of rotation X.

The release of the elastic member 25 causes its passing to a use position, because the elastic member 25 may slacken partially from its loaded state, the driven member 21 being configured to guide the elastic member 25 as far as its use position.

These different points will be explained in a detailed way below.

As visible in FIG. 1, the output shaft 11 and the drive shaft 7 are aligned with each other along the axis of rotation X.

The drive shaft 7 and output shaft 11 are spaced axially from each other, as visible in FIG. 4. A lower end 33 of the output shaft 11 is separated from an upper end 35 of the drive shaft 7 by an empty space 37. Thus, the output shaft 11 and the drive shaft 7 are not in direct contact and are thermally decoupled from each other.

The driving member 23 is attached to the lower end 33 of the output shaft 11. The driven member 21 is attached to the upper end 35 of the drive shaft 7.

The elastic member 25, in the illustrated example, is a helical spring having first and second ends 39, 41 opposite to each other. Alternatively, the elastic member 25 is a spiral spring or of any other type suitable for this purpose.

In the operational state of the coupling device 13, the elastic member 25 is coaxial with the axis of rotation X.

The attachments comprise a permanent attachment 27 of the first end 39 to the driving member 23 and a removable attachment 29 of the second end 41 to the driving member 23.

Figure 6:
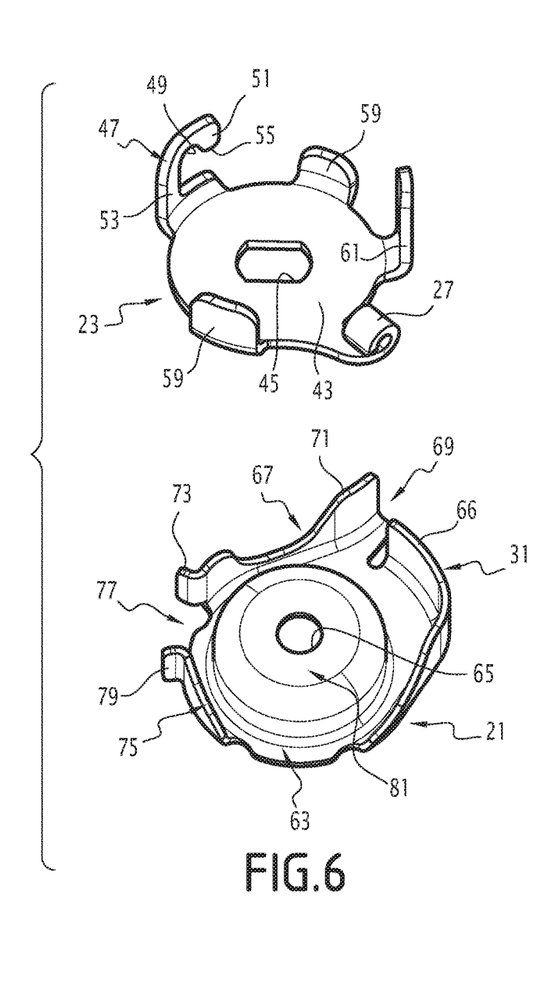
FIG. 6 is a perspective view of the driving and driven members of the coupling device of FIG. 3.

As visible in FIG. 6, the driving member 23 is typically a part in the deep drawn metal part. It has a general cup shape.

More specifically, the driving member 23 has an upper bottom 43. The upper bottom 43 is substantially flat here.

In the illustrated example, the upper bottom 43 has an orifice 45 into which is engaged an attachment member 46 of the driving member 23 to the output shaft 11 (FIG. 4).

The permanent attachment 27 is, for example, a hook rolled around the first end 39 of the elastic member 25. The hook is deformed to secure the first end 39 to the driving member 23.

The removable attachment 29, for example, comprises a hook 47 secured to the upper bottom 43, having a supporting area 49 turned towards the upper bottom 43. The supporting area 49 is circumferentially delimited on one side, by a lateral abutment 51. Opposite to the abutment 51, the supporting area 49 is delimited by a leg 53 connecting with the upper bottom 43. A passage 55 subsists between the top of the abutment 51 and the upper bottom 43.

The hook 47 thus has a general L shape. The shaft 7 protrudes relative to the upper bottom 43 parallel with the direction of the output shaft 11.

The permanent attachment 27 is located, along the direction of the output shaft 11, closer to the upper bottom 43 than the supporting area 49.

In the temporary position illustrated in FIG. 5, the second end 41 of the elastic member 25 is elastically urged against the supporting area 49 parallel to the output shaft 11. The second end 41 is also elastically urged against the lateral abutment 51, circumferentially around the output shaft 11. Thus, the second end 41 is laid on the supporting area 49, at a junction between the latter and the lateral abutment 51.

As visible in FIG. 4, in the temporary position, an upper turn 57 of the elastic member 25, which ends with the first end 39, is preferably bearing against the upper bottom 43.

The permanent attachment 27 and the removable attachment 29 are shifted angularly relatively to each other around the output shaft 11 by about 150°. Thus, in the temporary position, the first and second ends 39, 41 of the elastic member 25 are oriented along the radial directions, shifted by about 150° in the illustrated example.

On the contrary, at rest as illustrated in FIG. 2, the first and second ends 39, 41 form with each other an angle typically less than 120°.

The driving member 23 also includes folded edges 59 around the upper bottom 43, which provides the possibility of maintaining the elastic member 25 in position relative to the upper bottom 43. Notably, the folded edges 59 limit the displacements of the upper turn 57 relatively to the upper bottom 43.

The folded edges 59 are folded on the same side of the upper bottom 43 as the fixed 27 and removable 29 attachments.

As visible in FIG. 6, the driving member 23 further includes a driving tab 61, the function of which will be explained later on. The tab 61 is secured to the upper bottom 43 and folded on the same side of the upper bottom 43 as the edges 59 and the attachments 27, 29.

The driven member 21, in the illustrated example, is also a deep drawn metal part. It has a general cup shape.

The driven member 21 comprises a lower bottom 63, typically having in its center an orifice 65 into which is engaged the upper end 35 of the drive shaft 7.

In the exemplary embodiment of FIGS. 1 to 6, the release member 31 protrudes relative to the lower bottom 63 parallel to the drive shaft 7. The release member 31 has a selected shape so that, when the coupling device 13 is brought to the intermediate state, the release member 31 lifts up the second end 41 of the elastic member 25 above the supporting area 49, by a height sufficient for crossing the lateral abutment 51.

More specifically, the release member 31 is a first raised edge 31 raised from the lower bottom 63. This edge is folded on one side of the lower bottom 63 turned towards the driving member 23 in the operational state of the coupling device 13.

The release member 31 extends circumferentially over a portion of the periphery of the driven member 21. It is delimited towards the driving member 23 by an upper edge comprising a portion 66 extending in a plane substantially perpendicular to the drive shaft 7.

The driven member 21 moreover includes a second raised edge 67 protruding from the lower bottom 63, and shifted in the second direction of rotation R2 relative to the first raised edge. The second raised edge 67 is separated from the first raised edge by a first notch 69. Once released from the removable attachment 29, the second end 41 of the elastic member 25 upon relaxation will be housed in the first notch 69 in the use position. This situation is illustrated in FIG. 3.

More specifically, in the use position, the second end 41 will be flattened against an end portion 71 of the second raised edge 67. The end portion 71 borders the first notch 69.

The second raised edge 67 further has an end portion 73, opposite to the end portion 71, intended to cooperate with the driving tab 61, as explained later on.

The driven member 21 further includes a third raised edge 75, protruding relatively to the lower bottom 63. The third raised edge 75 is shifted in the second direction of rotation R2 relatively to the second raised edge 67, and is separated from this second raised edge by a second notch 77.

The driving tab 61 of the driving member 23 is engaged into the second notch 77 in the operational state of the coupling device 13, as illustrated in FIG. 3.

As visible in FIG. 6, the end portion 73 of the second raised edge 67, which adjoins the second notch 77, is folded in a plane substantially radial relatively to the drive shaft 7. Also, the third raised edge 75 has an end portion 79, adjoining the second notch 77, folded in a plane substantially radial relative to the drive shaft 7.

Thus, in the operational state of the coupling device 13, the driving member 23 is in direct contact with the second raised edge 67 to drive the driven member 21 in rotation relative to the valve body 3 around the axis of rotation X in the first direction of rotation R1.

More specifically, the driving tab 61 directly bears against the end portion 73. The elastic member 25 circumferentially urges the second raised edge 67 towards the driving tab 61, maintaining the end portion 73 flattened against the driving tab 61.

In the case of a failure of the elastic member 25, the driving tab 61 may cooperate with the third raised edge 75 for driving the driven member 21 into rotation in the second direction of rotation R2. More specifically, the driving tab 61 is able to come and bear directly against the end portion 79 of the third raised edge in order to drive the driven member into rotation.

As visible in the figures, the lower bottom 63 advantageously includes a concave central area 81 towards the valve body 3. The central area 81 forms a protruding dome towards the driving member 23 relatively to the peripheral area of the lower bottom 63.

The central area 81 is engaged inside the elastic member 25. An end turn 83 of the elastic member 25, which ends with the second end 41, is positioned around the central area 81, in contact with the lower bottom 63. The raised edges 31, 67 and 75 maintain the end turn 83 in position relative to the driven member 21. They limit the movements of the end turn 83 relatively to the lower bottom 63.

Moreover, as illustrated in FIG. 5, the valve body 3 bears bearings 85 that guide the drive shaft 7. These bearings 85 are positioned around the upper end 35 of the drive shaft 7 and are rigidly attached to the valve body 3. As visible in FIG. 4, the bearings 85 are at least partly engaged inside the concave central area 81, and are thus protected from projections of foreign bodies such as water, dust, gravel, etc.

Moreover in FIG. 4 it is seen that the bearings 85 bear a seal ring 87. An additional seal ring 89 is rigidly attached to the inside of the concave central area 81, around the orifice 65. It is added in a sealed way around the drive shaft 7.

The seal rings 87 and 89 have respective surfaces cooperating with each other to generate a rotating seal to prevent leaks of exhaust gas along the drive shaft 7. Because, in the use position, the elastic member 25 is axially compressed between the driving member 23 and the driven member 21, the seal rings 87 and 89 are urged against each other by the elastic member 25.

In the operational state of the coupling device, the driving member 23 and the driven member 21 are positioned facing each other. The hook 47, the driving tab 61, and the edges 59 point towards the driven member 21 from the upper bottom 43.

Conversely, the first, second and third raised edges 31, 67, 75 point towards the driving member 23 from the lower bottom 63.

The elastic member 25 is compressed parallel to the axis of rotation X between the driving member 23 and the driven member 21, and more specifically between the lower 63 and upper 43 bottoms.

The first end 39 of the elastic member 25 is attached to the driving member 23 through the permanent attachment 27. The second end 41 is engaged into the first notch 69, and will bear against the first end portion 71 of the second raised edge 67. Circumferentially the second end 41 urges the latter against the driving tab 61.

The driving tab 61 is inserted into the second notch 77.

The intermediate state of the coupling device 13 corresponds to a state wherein the driven member 21 and the driving member 23 are substantially in the same positions as in the operational state. On the other hand, the elastic member 25 is in its temporary position and not in its use position.

In the intermediate state of the exemplary embodiment of FIGS. 1 to 6, the driven member 21 and the driving member 23 are laid out facing each other. The hook 47, the driving tab 61, and the edges 59 point towards the driven member 21 from the upper bottom 43.

Conversely, the first, second, and third raised edges 31, 67, 75 point towards the driving member 23 from the lower bottom 63.

The driving tab 61 is inserted into the second notch 77.

On the other hand, the elastic member 25 does not urge the second raised edge against the driving tab 61.

It should be noted that in the first embodiment, the coupling device 13 never reaches its intermediate state. The elastic member 25 is released while the driving member 23 is brought closer to the driven member 21, before or just when the coupling device 13 reaches its intermediate state.

The operation of the valve 1 will now be described.

In order to displace the flap 5 in rotation around the axis of rotation X in the first direction of rotation R1, the actuator 9 drives the output shaft 11 in the first direction of rotation R1. For example, the first direction of rotation R1 corresponds to a closing movement aiming at displacing the flap 5 as far as its position for obturating the passage 15.

The driving tab 61 is normally directly bearing against the end portion 73 of the second folded edge. The driving member 23 therefore pushes the driven member 21 by direct contact between the driving tab 61 and the second raised edge 67.

The driven member 21 in turn drives the drive shaft 7, which drives the flap 5.

In order to displace the flap 5 around the axis of rotation X in the second direction of rotation R2, the actuator 9 drives the output shaft 11 according to said second direction of rotation R2 around the axis X. Typically, the second direction of rotation R2 corresponds to a displacement of the flap 5 from its obturation position towards a partial or total position for clearing the passage 15.

The driving member 23 is therefore driven into rotation around the axis of rotation X. This movement is transmitted to the driven member 21 through the elastic member 25, which permanently urges the driven member 21 into rotation in the second direction of rotation R2. The elastic member 25 forces the second raised edge 67 to follow and remain in contact with the driving tab 61.

In the case when the elastic member 25 would be damaged, for example broken, the rotary movement along the second direction of rotation R2 around the axis X is transmitted to the driven member 21 through the driving tab 61 which will directly bear against the end portion 79 of the third raised edge 75.

The method for mounting a valve 1 as described above will now be detailed.

This method is specially suitable for such a valve 1.

The method includes a first step during which the elastic member 25 is hooked-up with the driving member 23 through the attachments 27 and 29 in the temporary position. The elastic member 25 is elastically loaded.

The elastic member 25 is only hooked up with the driving member 23. It is not hooked up with the driven member 21.

The driving member 23 is, for example, already attached to the output shaft 11, the latter being already assembled to the actuator 9.

The driven member 21, for example, already mounted on the drive shaft 7. Typically, the additional seal ring 89 is itself also already attached to the drive shaft 7 and to the driven member 21.

The method advantageously includes a step during which the flap 5 is introduced into the inside of the valve body 3, and the drive shaft 7 is mounted in the bearings 85 and then rigidly attached to the flap 5. The driven member 21 is then in place, outside the valve body 3, in the position illustrated in FIG. 4.

The method further comprises a step wherein the coupling device 13 is brought to its intermediate state.

This operation is typically performed by approaching the driving member 23 and the driven member 21 toward each other along a direction parallel to the axis of rotation X.

More specifically, the output shaft 11 and the drive shaft 7 are aligned with each other, and the driving member 23 and the driven member 21 are brought closer to each other.

The method further comprises a step wherein the elastic member 25 is released at least partly from the attachments 27, 29. The elastic member 25 then passes from the temporary position to a use position under the effect of a relaxation of the elastic load. The coupling device 13 accordingly passes from the intermediate state to the operational state. The operational state is as described above.

More specifically, when the coupling device 13 is brought to its intermediate position, the driving member 23 and the driven member 21 are displaced one towards the other. The portion 66 of the upper edge of the release member 31 will bear against the portion of the end 41 of the elastic member 25 which radially protrudes beyond the hook 47. The release member 31 thus lifts up the second end 41 above the supporting area 49, by a sufficient height so that the second end 41 crosses the lateral abutment 51.

Because the elastic member 25 in the temporary position is elastically loaded in compression parallel to the output shaft 11 and circumferentially in the second direction of rotation R2 around the output shaft 11, the second end 41 once it is lifted up above the lateral abutment 51 moves in the second direction of rotation R2 along the upper edge of the release member 31. When the second end 41 arrives at the circumferential end of the release member 31 adjoining the first notch 69, it falls into the first notch 69 under the effect of the axial loading of the elastic member 25. The second end 41 will line up along the end portion 71 of the second folded edge, under the effect of the circumferential loading of the elastic member 25.

The central area 81 contributes to guiding the turns of the elastic member 25 towards the use position, notably before releasing the elastic member 25, during the assembling. Indeed, when the coupling device 13 is brought to its intermediate state, the turns of the elastic member 25 may not be perfectly coaxial with the output shaft 11. In the presence of the convex central area 81, the first turn 83, if it is off-centered, will come into contact with the area 81 and will be re-centered by sliding on the latter. The elastic member 25 is thus found in a more coaxial position relatively to the drive shaft 7, which facilitates the assembling and avoids that the elastic member 25 be positioned abnormally at the moment of its release.

Advantageously, the actuator 9 is then rigidly attached to the tabs 17 by the bolts or screws 19.

The valve 1 described above has multiple advantages.

The flap 5 is positioned in a specific way because the driving member 23 and the driven member 21 are constantly in contact with each other. There is no circumferential play between the driving 23 and driven 21 members.

This contact is a linear contact, which reduces the heat transfers from the driven member 21 to the driving member 23.

The structure of the coupling device 13 gives the possibility of absorbing geometrical variations, notably defects in the alignment between the drive shaft 7 and the output shaft 11.

Thermal decoupling of the output shaft 11 relative to the drive shaft 7 is excellent.

The mounting is considerably facilitated both during the initial assembling and in after-sales. The elastic member 25 is preloaded beforehand on the driving member 23, the mounting on the valve 1 being sufficient for giving it its final use position. The mounting may be carried out without any particular tooling, and without it being necessary to provide intensive training to the operators. The risk of a poor mounting is extremely limited.

The valve 1 according to the first embodiment may have multiple alternatives.

Figure 7:
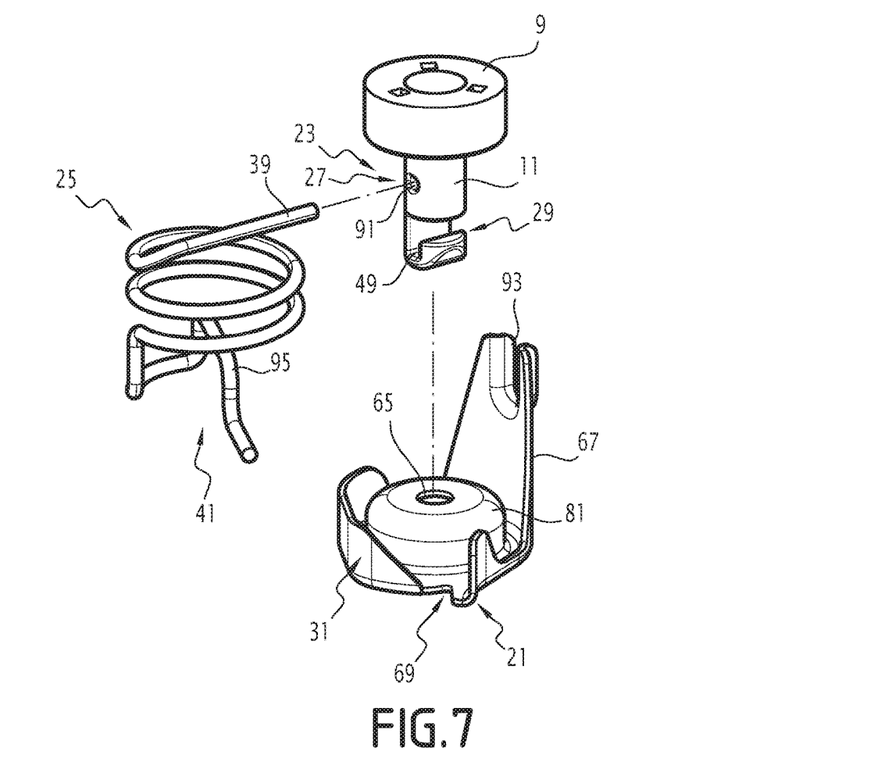
FIG. 7 is a perspective view of the coupling device for an alternative of the first embodiment of the invention

A first alternative embodiment is illustrated in FIG. 7. Only the points by which this first alternative differs from that of FIGS. 1 to 6 will be detailed below. Identical elements or ensuring the same functions will be designated with the same references.

In the alternative of FIG. 7, the driving member 23 is part of the output shaft 11.

The permanent attachment 27 is an orifice 91 diametrically crossing the drive shaft 7. The removable attachment 29 is a hook laid out at the lower end 33 of the output shaft 11.

The first end 39 of the elastic member 25 protrudes out of the orifice 91 and cooperates with the driven member 21 to drive the latter into rotation around the axis of rotation X. It replaces the driving tab 61 of the alternative of FIGS. 1 to 6.

The first end 39 is engaged into a notch 93 formed in the second raised edge 67. This notch 93 replaces the second notch 77 of the alternative of FIGS. 1 to 6. The second raised edge 67 is much higher than the first raised edge.

The removable attachment 29 cooperates with a notch-shaped portion 95 of the second end 41 of the elastic member 25.

According to another alternative embodiment, not shown, the driving tab 61 forms the hook 47 of the removable attachment.

The permanent attachment 27 may have several shapes.

According to an alternative embodiment, the permanent attachment 27 forms a sliding pivot into which is engaged the first end 39 of the elastic member 25.

According to a second alternative embodiment, the driving member 23 comprises a deformed portion around the first end 39 of the elastic member 25, or conversely the first end 39 is deformed around a portion of the driving member 23.

According to a third alternative embodiment, the elastic member 25 is welded on the driving member 23.

According to a fourth alternative embodiment, the permanent attachment 27 is a hook into which is engaged the first end 39 of the elastic member 25, with a supporting surface against which the first end 39 is urged when the elastic member 25 is elastically loaded, in a temporary position and in a use position.

The permanent attachment 27 and the removable attachment 29 may be of any other suitable type.

According to another alternative embodiment, not shown, the driving tab 61 extends in a plane tilted relatively to the axis of rotation. In FIGS. 1 to 6, the driving tab 61 extends in a plane substantially parallel to the axis of rotation X.

Figure 8:
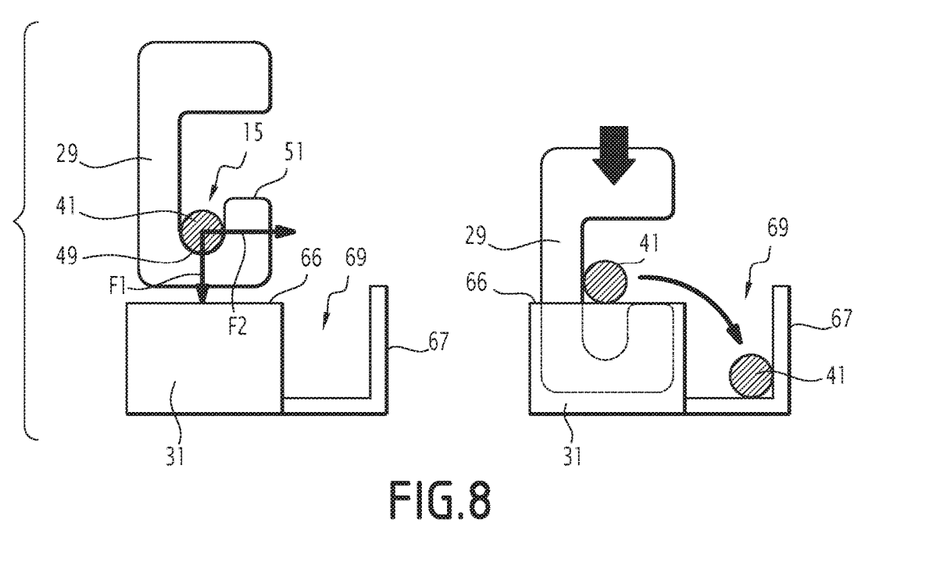
FIGS. 8 and 9 are schematic illustrations demonstrating the difference between the coupling device of FIGS. 1 to 6 and a second alternative of the first embodiment.
Figure 9:
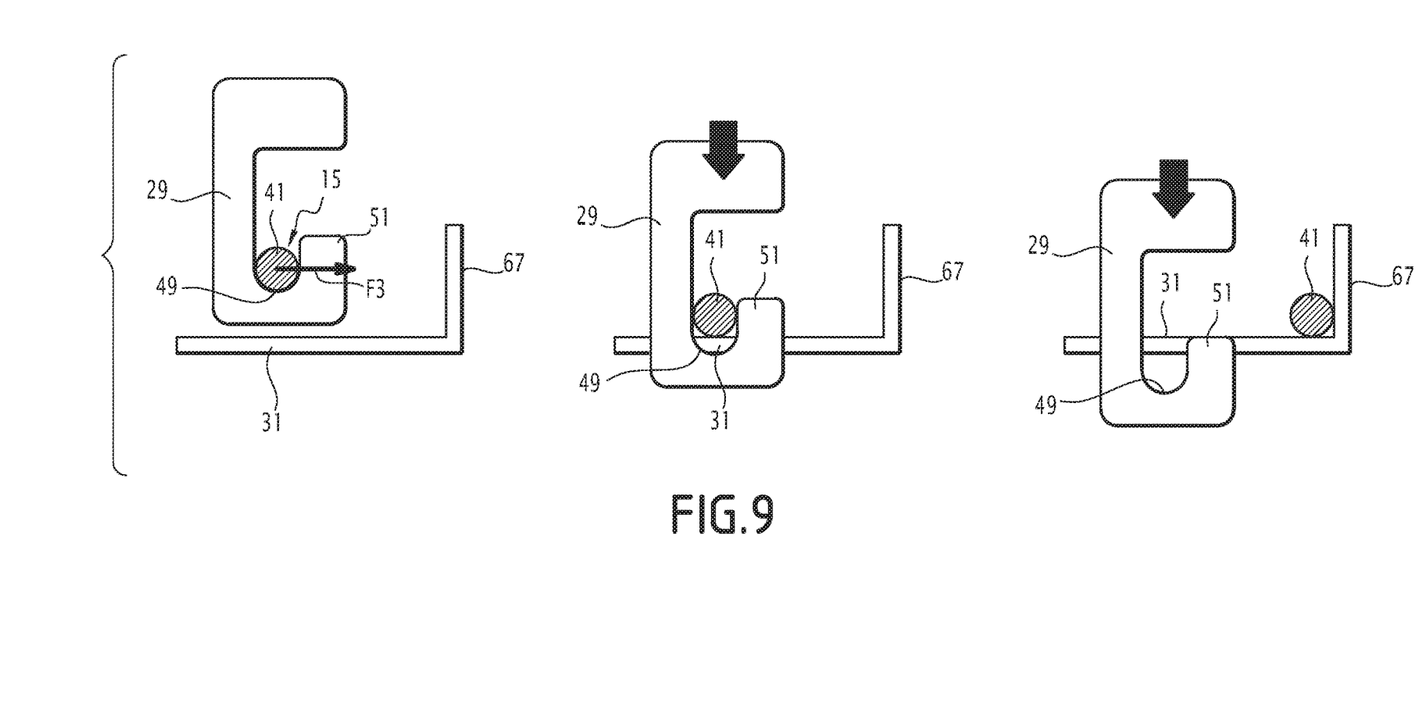

According to another alternative explained in FIGS. 8 and 9, the elastic member 25 in the temporary position is only elastically loaded circumferentially around the output shaft 11.

In the alternative embodiment of FIGS. 1 to 6, the elastic member 25 in the temporary position is elastically loaded in compression parallel to the output shaft (arrow F1 of FIG. 8) and circumferentially around the output shaft 11 (arrow F2 of FIG. 8). The release member 31 lifts up the second end 41 of the elastic member 25 above the abutment 51, the second end 41 moves in the second direction of rotation R2 and parallel to the output shaft 11, in order to fall into the first notch 69.

In the alternative embodiment of FIG. 9, the elastic member 25 in a temporary position is not elastically loaded in compression. The release member 31 lifts up the second end 41 of the elastic member 25 above the abutment 51, the second end 41 only moving in the second direction of rotation R2, because of the circumferential elastic load (arrow F3 de FIG. 9). The driven member 21 does not include any notch, or includes a notch with a smaller depth than in the alternative of FIGS. 1 to 6. The axial compression of the elastic member 25 in the use position is given to this member upon releasing the second end, because of the lifting performed by the release member 31.

According to another alternative, the second end 41 of the elastic member 25 in the temporary position is not bearing upon a tab but on any other portion of the driving member 23, the second end 41 being folded according to an adequate shape with this purpose.

A second embodiment of the invention is illustrated in FIG. 10. Only the points by which this second embodiment differs from the first will be detailed below. Identical elements or ensuring the same functions will be designated with the same references.

In the second embodiment, the elastic member 25 is manually released at least partly from the attachments 27, 29, when the coupling device 13 is in the intermediate state.

The driven member 21 does not include any release member, as illustrated in FIG. 10.

In the exemplary embodiment of FIG. 10, an operator manually lifts up the second end 41 of the elastic member 25, by a sufficient height so that it crosses the lateral abutment 51. The elastic member 25, once it is released, adopts its use position under the effect of a relaxation of the elastic load.

Alternatively, the operator radially pushes the second end 41 towards the axis of rotation X until the second end 41 is no longer bearing upon the hook 47.

According to another alternative, the removable attachment 29 includes a divisible or deformable jamming part which blocks the second end 41 of the elastic member 25 in position, and therefore maintains the elastic member 25 in a temporary position. The elastic member 25 is released from the removable attachment 29 by deforming, by severing, or by withdrawing the blocking part.

According to still another alternative, the second end 41 of the elastic member 25 is divisible or deformable. The elastic member 25 is released from the removable attachment 29 by deforming or by severing the second end.

The output shaft is not necessarily directly driven into rotation by the actuator, but may be driven via a torque transmission device. Also, the flap is not necessarily mounted directly on the drive shaft. It may be mounted on another shaft, itself driven into rotation by the drive shaft.

The coupling device may be brought to the temporary position not by bringing the driving member and the driven member closer to each other along a direction parallel to the axis of rotation but by bringing the driving member and the driven member closer to each other along a different direction or according to any other suitable movement.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust line valve of a vehicle, the valve comprising:
    a valve body;
    a flap positioned inside the valve body and movable relative to the valve body;
    a drive shaft to drive the flap;
    an actuator;
    an output shaft driven into rotation by the actuator;
    a coupling device comprising a driven member bound to the drive shaft, a driving member bound to the output shaft, and an elastic member;
    the coupling device having an operational state in which the driving member is laid out to drive the driven member into rotation relative to the valve body around an axis of rotation at least in a first direction of rotation, the elastic member being in a use position in which the elastic member is axially compressed between the driving member and the driven member and urges the driven member into rotation relative to the valve body around the axis of rotation in a second direction of rotation opposite to the first direction of rotation; and wherein
    the driving member comprises attachments configured to hook up the elastic member to the driving member in a temporary position in which the elastic member is elastically loaded, the temporary position being different from a use position,
    the coupling device may be brought to an intermediate state with the elastic member in the temporary position,
    the driven member comprises at least one release member configured to release at least partly the elastic member of the attachments when the coupling device is brought to the intermediate state or the elastic member, when the coupling device is in the intermediate state, may be at least partly released from the attachments, and
    the elastic member once released, adopts the use position under an effect of relaxation of the elastic load, the coupling device then adopting the operational state.

2. The valve according to claim 1, wherein the driven member is configured to guide the elastic member once the elastic member has been at least partly released from the attachments, as far as the use position.

3. The valve according to claim 1, wherein the elastic member in the temporary position is elastically loaded in compression parallel to the output shaft and circumferentially around the output shaft.

4. The valve according to the claim 1, wherein the elastic member is a helical spring having first and second ends opposite to each other, the attachments comprising a permanent attachment of the first end to the driving member and a removable attachment of the second end to the driving member released so as to have the elastic member pass to the use position.

5. The valve according to claim 4, wherein the driving member includes an upper bottom, the removable attachment comprising a hook secured to the upper bottom, the hook having a supporting area turned towards the upper bottom, and circumferentially delimited on one side by a lateral abutment, the second end of the elastic member in a temporary position being elastically urged against the supporting area parallel to the output shaft and circumferentially against the lateral abutment around the output shaft.

6. The valve according to claim 5, wherein the driven member comprises a lower bottom, the release member protruding relatively to the lower bottom parallel to the drive shaft and being of a selected shape so that, when the coupling device is brought to the intermediate state, the release member lifts the second end above the supporting area by a sufficient height for crossing the lateral abutment.

7. The valve according to claim 6, wherein the release member is a first edge raised from the lower bottom, the driven member having a second edge raised from the lower bottom shifted in the second direction of rotation relatively to the first raised edge, the second raised edge being separated from the first raised edge by a first notch into which will be housed the second end in the use position.

8. The valve according to the claim 1, wherein the driven member comprises a lower bottom having a central area concave towards the valve body, the valve body bearing guidance bearings of the drive shaft at least partly housed in the central area.

9. A method for mounting a vehicle exhaust line valve, the valve comprising:
    a valve body;
    a flap positioned inside the valve body movable relative to the valve body;
    a drive shaft to drive the flap;
    an actuator;
    an output shaft driven into rotation by the actuator;
    a coupling device comprising a driven member bound to the drive shaft, a driving member bound to the output shaft, and an elastic member;
    the method comprising the following steps:
    hooking up the elastic member to the driving member with attachments in a temporary position wherein the elastic member is elastically loaded;
    bringing the coupling device to an intermediate state;
    at least partly releasing the elastic member from the attachments, the elastic member passing from the temporary position to a use position under the effect of relaxation of the elastic load, which causes the passing of the coupling device into an operational state wherein the driving member is laid out for driving the driven member into rotation relative to the valve body around an axis of rotation at least in a first direction of rotation, the elastic member in the use position being axially compressed between the driving member and the driven member and urging the driven member into rotation relative to the valve body around the axis of rotation in a second direction of rotation opposite to the first direction of rotation.

10. The method according to claim 9, wherein the elastic member is automatically at least partly released from the attachments when the coupling device is brought to the intermediate state.

* * * * *